United States Patent [19]

Franks et al.

[11] 4,292,527

[45] Sep. 29, 1981

[54] RADIATION DETECTION SYSTEM

[75] Inventors: Larry A. Franks; Stephen S. Lutz, both of Santa Barbara, Calif.; Peter B. Lyons, Los Alamos, N. Mex.

[73] Assignee: The United States of America as represented by the United States Department of Energy, Washington, D.C.

[21] Appl. No.: 949,163

[22] Filed: Oct. 6, 1978

[51] Int. Cl.³ .......................... G01J 1/58; G01T 1/16; C09K 11/06
[52] U.S. Cl. ................................ 250/483; 250/461 B; 250/487; 252/301.17
[58] Field of Search .................. 252/301.17; 250/368, 250/461, 483, 489

[56] References Cited

U.S. PATENT DOCUMENTS

| | | | |
|---|---|---|---|
| 2,931,905 | 4/1960 | Caha et al. | 250/368 |
| 3,413,466 | 11/1968 | Allen | 250/368 X |
| 3,444,089 | 5/1969 | Carter et al. | 252/301.17 |
| 3,886,082 | 5/1975 | Hyman | 252/301.17 |
| 3,984,332 | 10/1976 | Nelson et al. | 250/368 |
| 4,001,139 | 1/1977 | Long | 252/301.17 |
| 4,127,499 | 11/1978 | Chen et al. | 252/301.17 |

OTHER PUBLICATIONS

Organic Scintillators by Horrocks, pp. 79, 85, 385, published by Gordon and Breacn, New York, 1968.

Primary Examiner—F. Edmundson
Attorney, Agent, or Firm—John A. Koch; Dean E. Carlson; James E. Denny

[57] ABSTRACT

A radiation detection system including a radiation-to-light converter and fiber optic wave guides to transmit the light to a remote location for processing. The system utilizes fluors particularly developed for use with optical fibers emitting at wavelengths greater than about 500 nm and having decay times less than about 10 ns.

29 Claims, 3 Drawing Figures

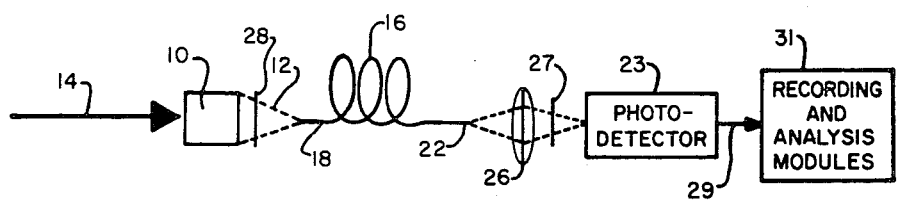

FIGURE 1.

| TABLE 2: ABBREVIATIONS |
|---|
| PT = p-terphenyl |
| PBD = 2-phenyl-5-(4-biphenylyl)-1,3,4 oxadiazole |
| BBO = 2,5-dibiphenylyloxazole |
| POPOP = p-bis(2-(5 phenyloxazolyl))-benzene |
| TPB = tetraphenylbutadiene |
| KR-620 = Kiton Red 620 (obtained from Exciton Chemical Company, Inc., Dayton, Ohio) |
| RhB = rhodamine-B |
| Nb = nitrobenzene |
| PS = polystyrene |
| PVT = polyvinyltoluene |
| DM-POPOP = dimethyl POPOP |
| Ex-590 = Exciton 590 |
| NE-O-1 = Nuclear Enterprises-orange-1 |
| R = rise time (10-90%) |
| $T$ = time from maximum to $e^{-1}$ of maximum |
| FWHM = full width at half maximum |
| $\epsilon$ = relative efficiency |
| $\lambda m$ = central wavelength of bandpass (the 600nm and 560 nm filters had FWHM of 10 nm) |
| [A]Sat indicates saturated concentration |
| [B]Xylene ethanol mixture in 5:1 proportion |

TABLE 1: FLUOR CONSTITUENTS AND PARAMETERS

| NO. | CONSTITUENTS ||||| EMISSION PARAMETERS ||||
|---|---|---|---|---|---|---|---|---|---|
| | SOLVENT | PRIMARY | SECONDARY | TERNARY | ADDITIVE | R [ns] | $\tau$ [ns] | FWHM [ns] | $\epsilon$ | $\lambda_m$ [nm] |
| 1L | Toluene | PT 4 g/l | BBO Sat$^A$ | RhB $10^{-4}$ Molar | — | 2.24 | 4.25 | 4.94 | 0.41 | 600 |
| 2L | Toluene | PT 4 g/l | POPOP Sat$^A$ | RhB $10^{-4}$ Molar | — | 2.22 | 4.23 | 5.38 | 0.37 | 600 |
| 3L | Toluene | PT 4 g/l | POPOP Sat$^A$ | RhB $10^{-4}$ Molar | Nb $9.8 \times 10^{-3}$ Molar | 2.15 | 3.14 | 4.48 | 0.22 | 600 |
| 4L | Toluene | PT 4 g/l | POPOP Sat$^A$ | RhB $10^{-4}$ Molar | Nb $18.6 \times 10^{-3}$ Molar | 1.82 | 3.11 | 4.15 | 0.12 | 600 |
| 5L | Toluene | PT 4 g/l | POPOP Sat$^A$ | RhB $10^{-4}$ Molar | Nb $58.7 \times 10^{-3}$ Molar | 0.96 | 3.05 | 3.60 | 0.04 | 600 |
| 6L | Toluene | PT 3 g/l | TPB 5 g/l | RhB $10^{-4}$ Molar | Phenol 1% | 0.67 | 3.08 | 3.06 | 0.20 | 600 |
| 7L | Toluene | PT 3 g/l | TPB 5 g/l | — | — | 0.48 | 1.20 | 1.38 | 0.20 | 560 |
| 7L | Toluene | PT 3 g/l | TPB 5 g/l | — | — | 0.27 | 1.15 | 1.40 | 0.25 | 560 |
| 8L | Pseudocumene | PBD 8 g/l | TPB 8 g/l | — | — | 2.53 | 8.28 | 1.24 | 0.49 | 560 |
| 9L | p-Xylene$^B$/Ethanol | PT 3 g/l | KR-620 $10^{-3}$ Molar | — | — | 1.88 | 7.42 | 9.3 | 3.40 | 600 |
| 10L | p-Xylene$^B$/Ethanol | PT 3 g/l | KR-620 $10^{-3}$ Molar | — | Nb $19.6 \times 10^{-3}$ Molar | 1.38 | 5.78 | 6.69 | 0.68 | 600 |
| 11L | p-Xylene$^B$/Ethanol | PT 3 g/l | KR-620 $10^{-3}$ Molar | — | Nb $39.2 \times 10^{-3}$ Molar | | | 6.15 | 0.29 | 600 |
| 12L | p-Xylene$^B$/Ethanol | PT 3 g/l | KR-620 $10^{-3}$ Molar | — | Nb $58.7 \times 10^{-3}$ Molar | 1.68 | 6.12 | 6.00 | 0.18 | 600 |
| 1P | PS | PT 2% | POPOP 1% | RhB 0.003% | — | 1.57 | 3.88 | 6.70 | 0.23 | 600 |
| 2P | PS | PT 2% | POPOP 1% | RhB 0.003% | — | 2.93 | | 4.93 | 0.10 | 600 |
| 3P | PS | PT 2% | DM-POPOP 2% | — | — | 1.54 | 5.5 | 9.60 | 1.80 | 600 |
| 4P | PS | PT 2% | POPOP 1% | Ex-590 0.003% | — | 1.29 | 4.72 | 5.68 | 0.42 | 560 |
| 5P | PS | PT 2% | POPOP 1% | Ex-590 0.003% | Phenol 0.25% | 1.25 | 4.20 | 5.00 | 0.43 | 560 |
| 6P | PS | PT 2% | POPOP 1% | Ex-590 0.003% | Phenol 0.5% | 1.07 | 4.52 | 4.58 | 0.52 | 560 |
| 7P | PS | PT 2% | POPOP 1% | Ex-590 0.003% | Phenol 1.0% | 0.92 | 3.62 | 4.55 | 0.51 | 560 |
| 8P | PS | PT 2% | POPOP 1% | Ex-590 0.003% | Phenol 2.0% | 0.41 | 2.89 | 4.05 | 0.11 | 560 |
| 9P | PVT | PT 3% | TPB 1.5% | — | — | 1.72 | 10.15 | 2.44 | 0.70 | 560 |
| 10P | PVT | PT 3% | TPB 1% | NE-0-1 0.001% | — | 0.23 | 3.27 | 10.3 | 1.6 | 560 |
| 11P | PS | PT 3% | TPB 2% | — | — | | | 2.53 | 0.64 | 560 |

RADIATION DETECTION SYSTEM

BACKGROUND OF THE INVENTION

The invention described herein was made in the course of Contracts EY-76-C-08-1183 and W-7405-ENG-36 with the U.S. Department of Energy.

This invention relates to radiation detection and more particularly to the detection of radiation and the transmission of intelligence corresponding to the radiation to a remote location for display, recording, and/or other processing. Even more particularly, this invention relates to radiation detection systems that utilize radiation-to-light converters, of the type commonly called fluors or scintillators, and optical fibers to transmit the light produced by the converter to the desired remote location.

In numerous applications where it is necessary to observe and characterize the radiation of charged particles, X rays, gamma rays, neutrons, and the like, the radiation detection system utilized can be thought of as comprising three basic functional units. First, the radiation is detected; second, a signal of some kind produced by the detector in response to the radiation is transmitted to a remote location; and third, the transmitted signal is utilized to produce a recording and/or display or otherwise processed to provide information on the radiation. It is apparent that errors introduced into the system by any of the functional units will affect the ability of the system to accurately characterize the observed radiation.

The detection of radiation is commonly accomplished utilizing a transducer which responds to the radiation in a manner which can be used to generate an electrical signal which corresponds to some characteristic of the radiation. The electrical signal is transmitted over electric cables, commonly coaxial cables, to a location remote from the transducer for processing. However, the transmission characteristics of coaxial cables are such that significant distortion of information can occur, particularly in pulses of duration shorter than about 5 nanoseconds (ns).

The advent of commercially available fiber optic wave guides, commonly called optical fibers, has stimulated much interest in their possible use in intelligence gathering and transmitting systems generally. Since the fibers have inherently greater information-carrying capacity than coaxial cables, their use as signal-carrying means in place of coaxial cables is, potentially, very attractive. With respect to systems for detecting and transmitting intelligence regarding radiation, U.S. Pat. No. 3,984,332 to Melvin A. Nelson, Terence J. Davis, and John R. Morton III, assignors to the assignee of the instant application, is of interest. That patent, entitled "Radiation Detection System," is directed to a system wherein the optical fiber serves as both the detector and the transmission means. Cerenkov light generated in a light guide by charged particle radiation is transmitted down the guide to the remote location for processing.

The optical transmission and modal dispersion characteristics of known fiber optic wave guides vis-a-vis the output characteristics of known transducers which convert radiation to light have heretofore prevented the development of practical systems wherein the optical fibers serve only as the transmission means. This has been particularly true when requirements of the radiation detection system combine wide bandwidth with long transmission lengths, i.e., bandwidths greater than about 50 MHz and lengths greater than about 300 M. Such practical systems would require a radiation-to-light converter having emission wavelengths long enough to minimize absorption in the fiber. In addition, where the radiation to be detected is a very fast transient pulse, such as occurs in connection with a nuclear explosion, it is necessary for diagnostic purposes that the decay time of the light emission be very short, less than a few nanoseconds for some purposes.

However, commercially available long-wavelength fluors (500 to above 600 nm) have decay times in excess of about 15 ns, which would place serious bandwidth limitations on a fluor-fiber system. On the other hand, commercial fluors which have short decay times have emission maxima less than about 430 nm. This short wavelength makes them unsuitable for long fiber transmission lengths since the optical attenuation of fibers increases roughly as $\lambda^{-4}$ where $\lambda$ is the wavelength. The increasing optical attenuation with decreasing wavelength is an inherent characteristic of optical fibers. It is caused by Rayleigh scattering from compositional fluctuations in the fiber. These fluctuations are introduced during production and are present in all currently available high bandwidth fibers.

BRIEF SUMMARY OF THE INVENTION

Accordingly, it is an object of the invention to provide a radiation detection system which utilizes a radiation-to-light converter in combination with an optical fiber which transmits light produced by the converter to a remote location for recording, display, and/or other processing. Another object of the invention is to provide fluors suitable for use in radiation detection systems which utilize optical fibers as the means to transmit information regarding the radiation to a remote location.

Briefly summarized, the above and additional objects are accomplished by providing radiation-to-light converters which produce light having characteristics more peculiarly matched to the transmission characteristics of optical fibers. These output characteristics of the converters include emission at wavelengths long enough to avoid excessive attenuation by transmission through the fibers and a decay time short enough to permit resolution of fast pulses. The practical lower limit with regard to wavelength is about 500 nm and the upper limit with regard to decay time is about 10 ns.

It has been found that novel fluors having output characteristics within the necessary range of values can be produced from readily available chemicals. Organic liquids and plastics which fluoresce in the 300 to 400 nm region are used as solvents into which a number of selected solutes are dissolved to obtain fluors having characteristics falling within the usable range of wavelengths and decay time. The energy of the ionizing radiation absorbed by the fluor is successively transferred from the base material, or solvent, to the primary solute to the secondary solute, and if necessary, to the ternary solute. Accordingly, a criterion in the selection of the base and solutes is that the optical emission band of the donor, or the species transferring the energy, overlaps the optical absorption band of the species accepting the energy. However, the total chain of energy transfers provided in a particular fluor in order to attain the 500 nm plus region must be accomplished in conjunction with attaining a relatively fast decay time and an efficiency comparable to fluors emitting in the 400–430 nm region. In some solvent/solute combinations, decay times can be improved with the addition of quenching agents.

Liquid and plastic fluors have been developed which emit in the 500 to 600 nm region. These include ternary liquid systems with decay times as short as 1.3 ns at 560 nm and plastic fluors with decay times less than 3 ns at 560 nm. Other liquid and plastic fluors are provided with improved emission characteristics in the region of 600 nm. Conversion efficiencies, on a pulse amplitude basis, are generally lower than that of a commercially available 570 nm-16 ns plastic fluor.

A better understanding of the invention will appear after consideration of the following detailed description.

BRIEF DESCRIPTION OF THE DRAWINGS

FIG. 1 is a schematic representation of a radiation detection system in accordance with the invention;

Table 1 is a table of compositions and performance parameters of fluors in accordance with the invention; and Table 2 is a table of abbreviations used in Table 1 and throughout this specification.

DETAILED DESCRIPTION

Referring now to FIG. 1, a radiation-to-light converter 10 in accordance with the invention, emits light 12 when subjected to radiation 14. A substantial portion of the emitted light 12 is at a wavelength greater than 500 nm and a decay time less than about 10 ns in order to provide an appropriate match with the optical transmission characteristics of fiber optic wave guide 16. Emitted light 12 is received at one end 18 of guide 16, transmitted therethrough and emitted at the other end 22. It is then detected by a suitable photodetector 23 after suitable processing, such as by lens 26 and filter 27, if desired. A filter 28 between fluor 10 and fiber receiving end 18 in place of, or in addition to, filter 27 may be preferable in some applications. The output 29 of photodetector 23, which is representative of radiation 14, is then available for display, recording, analysis, and/or other processing such as by recording and analysis modules 31.

The constituents of particular liquid and plastic fluors for radiation-to-light converter 10 are given in Table 1. The abbreviations used in Table 1 are listed in Table 2. The liquid and plastic fluors having the necessary emission parameters are identified as Items 1L to 13L and 1P to 11P, respectively. In all cases, the liquid solvent or base plastic is listed first and the solutes listed in the order of their succession. The final columns of both tables contain emission and efficiency characteristics determined for each fluor at the wavelengths indicated. The efficiency $\epsilon$ determined on a pulse amplitude basis is relative to the commercial fluor, NE-108, obtained from Nuclear Enterprise of San Carlos, Calif. The preparation and testing techniques employed in the characterization of these fluors will be presently described.

The selected fluor base materials, i.e., toluene, pseudocumene, p-xylene, polystyrene (PS), and polyvinyltoluene (PVT) fluoresce in the 280 to 350 nm region. To facilitate transfer of this energy to a more desirable spectral region, several intermediate shifters, in solution with the base material, are necessary. Shifter systems found to be particularly advantageous are para-terphenyl (PT)—POPOP, 2-phenyl-5-[4-biphenylyl]-1,3,4 oxadiazole (PBD)—tetraphenylbutadiene (TPB), and PT—TPB. In many successful formulations, a rhodamine laser dye is introduced as a tertiary solute. The laser dye, excited by the secondary shifter, emits photons in the 560 to 650 nm region. Typical decay times of these solutions are less than 5 ns at 600 nm.

Entries 1L through 12L of Table 1 illustrate multi-solute liquid fluors designed to emit in the 560–600 nm region. Items 3L–5L and 10L–12L show how a common quenching agent (nitrobenzene) can be used to improve the decay time of liquid fluor systems (with attendant loss of efficiency). Entries 1P through 11P of Table 1 illustrate useful plastic-based fluors developed to emit in the 560–600 nm region. Items 4P–8P illustrate the effect of phenol quenching in reducing the decay time of one plastic system.

EXAMPLES

All solvent and solutes, which were obtained from commercial suppliers, were of ultra high purity and used without further purification. In general, the solutes used were from the same batch. The toluene used as the solvent in essentially all solutions in Table 1 was of high purity but not from the same batch. As indicated above, the commercial plastic fluor NE-108 was employed throughout as the intensity standard, i.e., $\epsilon$ value for NE-108 equals 1.0.

Liquid scintillators were prepared using toluene, pseudocumene (1,2,4 trimethyl benzene) and p-xylene as solvents. Primary solutes used were p-terphenyl (PT) and 2-phenyl-5-(4-biphenylyl)-1,3,4 oxadiazole (PBD). Secondary and tertiary solutes included 2,5-diphenylyloxazole (BBO); p-bis[2-(5 phenyloxazolyl)]-benzene (POPOP); 1,1,4,4 tetraphenylbutadiene (TPB); rhodamine B (RhB); and Kiton Red obtained from Exciton Chemical Company, Inc., of Dayton, Ohio. The plastic fluors were prepared using polystyrene (PS) or polyvinyltoluene (PVT) as the base. Solutes for the plastic fluors included PT, BBO, POPOP, dimethyl POPOP (DM-POPOP), rhodamine-B, Exciton 590, and NE-orange-1 (NE-O-1). Formulations of selected liquids and plastic fluors are listed in Table 1.

The basic time decay measurements were made using an electron linear accelerator (linac) and its associated data acquisition system. The samples were irradiated with a 50-ps burst of 6-MeV electrons at a pulse rate of 360 pps. In a configuration similar to that shown schematically in FIG. 1, the liquid cell 10 was 2.0 cm in diameter by 2 cm long with fused silica windows, whereas the plastic fluors were standard 2- by ½-inch right circular cylinders. The fluors were positioned in a fixture rigidly attached to the beam tube so that the normal to the viewing face was 110° from the beam. The fluorescent emission was collected and transmitted by a 2-meter optical fiber bundle 16 to the InGaAsP photocathode of a cooled photomultiplier (PMT) 23. In all cases, a narrow-band optical filter 27 was used between the fiber end 22 and the PMT. The PMT output was closely coupled to the remote sampling head of a 140-A sampling oscilloscope from Hewlett-Packard of North Hollywood, Calif., and in turn to the linac data acquisition system. The relative peak conversion efficiency $\epsilon$ of each fluor was determined by comparing the signal-averaged peak amplitude per unit charge with that of NE-108 narrow-band-filtered at 570 nm, near the emission maximum. The charge was collected on a Faraday cup, not shown, mounted in the beam, aft of the fluor.

Decay times and efficiencies of a number of developmental liquid fluors are listed in the last five columns of Table 1. The λm values in the final column refer to the central wavelength of the bandpass where the data were taken. The first group of formulations (1L-6L) summarizes efforts to utilize the common red dye RhB as a final solute. While promising because of its fast decay and long wavelength emission, this compound is difficult to use effectively, because its 560 nm absorption band is not appreciably overlapped by common intermediate solutes. Formulation 1L, using PT and BBO as intermediates, yields a useful fluor with a 4.3 ns decay time and a relative efficiency of 0.41. A similar fluor is illustrated in 2L, where POPOP is substituted for BBO. Efforts to quench RhB are given in 3L-5L, where the effects of added nitrobenzene are summarized. One notes that $19.6 \times 10^{-3}$ mole nitrobenzene reduces the decay time from 4.23 to 3.11 ns. This is accompanied by a change in $\epsilon$ of from 0.37 to 0.12. At the maximum nitrobenzene concentration ($58.7 \times 10^{-3}$ M), the decay is reduced to 3.05 ns and the efficiency to 0.04.

Formulation 6L illustrates the effects of substituting TPB for BBO (or POPOP) as secondary solute. Phenol was added to increase the solubility and stability of the RhB in toluene. This compound, which has an unusually large Stoke's loss (4180 cm$^{-1}$), offers good overlap with the PT emission (approximately 340 nm) and the RhB absorption. Efficiency of this fluor is seen to be rather low ($\epsilon=0.20$), but it exhibits a very fast rise time (R=0.67 ns) and a relatively fast decay of 3.08 ns. This decay is similar to that which has been reported for an optically excited RhB-ethanol solution, I. B. Berlman, *Handbook of Fluorescence Spectra of Aromatic Molecules*, Academic Press, New York, p. 411 (1971).

Several ternary fluors showed very good emission characteristics. The first, 7L prepared with TPB and PT, has a very fast decay (1.4 ns at 600 nm) with a relatively low efficiency ($\epsilon=0.20$). The emission measured in this case is in the long wavelength tail of the broad 450 nm TPB emission band, which peaks at 450 nm.

The second ternary 8L was prepared with TPB and PBD in pseudocumene. This formulation had a fairly good efficiency ($\epsilon=0.49$ at 560 nm) and very fast rise and decay times. The last liquid formulation (9L) was prepared with Kiton Red (620) and PT and was characterized by an unusually high efficiency of 3.4 and a slow decay time. Formulations 10L-12L summarize efforts to quench 9L with added nitrobenzene. Quenching is clearly evident, as can be seen in 11L, where the decay time was reduced from 8.28 to 5.78 ns and the efficiency from 3.4 to 0.29. As in quenching of the RhB series, we note that the change in decay time per unit change in efficiency is small.

Emission parameters for selected plastic fluors are also summarized in Table 1. The 1P-8P group of fluors used polystyrene as the base plastic, and the first fluors of this group illustrate the use of RhB as the final solute. The Rhodamine B was obtained from Matheson Scientific, Elk Grove Village, Ill. As in the liquid fluors, efficient energy transfer from intermediate solutes to RhB was difficult to establish. Formulations 1P and 2P show that little ($\epsilon=0.23$ versus $\epsilon=0.1$) of the 600 nm emission comes via the transfer route when POPOP is used as intermediate. Similar results, not recorded in Table 1, were obtained using BBO. Dimethyl-POPOP, which has its emission band maximum at a longer wavelength than POPOP, provided a significantly more efficient transfer, as is seen in 3P. However, the fluor has relatively long rise and decay.

Efforts to quench the plastic fluors were generally unsuccessful. Quenching agents studied included nitrobenzene, phenol, bromobenzene, hexachlorocyclohexane, and 1-bromobutane. Of these, only phenol proved effective. The effects of adding phenol to a polystyrene-based fluor using Exciton 590 as the final solute are shown in 4P-8P. There, the data obtained at 560 nm show reductions in decay time from 5.5 ns to 3.62 ns with 2.0 percent added phenol. The behavior of the relative efficiency, which increases from 0.42 (4P) to a maximum of 0.52 at 6P before decreasing, is not understood. It may be due to shifts in the emission maximum of the Exciton 590 induced by the phenol.

Formulations 9P and 11P, each having a TPB secondary and PT primary, although having different bases, each exhibited fast rise and decay times ($\tau=2.89$ ns and 3.27) coupled with relatively high efficiency ($\epsilon=0.7$ and 0.64) at 560 nm. The 560 nm emission is from the long wavelength tail of the broad TPB band which peaks at approximately 450 nm. The use of TPB at the higher concentrations of 9P and 11P is particularly unique. At such concentrations, the energy transfer mechanism differs from that operating at low concentrations with the net result of a substantially reduced decay time. We noted that quarternary 10P employing NE-O-1 had a peak emission at approximately 590 nm, although the data were taken at a bandpass centered at 560. The fluor is characterized by relatively high efficiency ($\epsilon=1.6$) but a slow decay time ($\tau=10.15$ ns).

While the fundamental novel features of the invention have been shown and described and pointed out as applied to particular embodiments, it will be appreciated that various omissions, substitutions, and changes may be made within the principle and scope of the invention as expressed in the appended claims.

What we claim is:

1. A radiation detection system comprising:
   a. means for emitting light at wavelengths greater than about 500 nm with a decay time of less than about 10 ns in response to the detection of radiation, and
   b. a fiber optic wave guide positioned to receive said emitted light at its one end for the transmission of said light to a desired location.

2. The radiation detection system of claim 1, wherein said means for emitting light comprises a fluor solvent and a succession of fluor solutes including at least one intermediate and a final fluor solute therein, said final solute emitting at wavelengths greater than about 500 nm.

3. The radiation detection system of claim 2, wherein the emission band of said solvent and each successive solute overlaps with the absorption band of the next successive solute.

4. The radiation detection system of claim 3, wherein said solvent is selected from the group consisting of toluene, pseudocumene, p-xylene, polystyrene, and polyvinyltoluene.

5. The radiation detection system of claim 3, wherein said final solute is selected from the group consisting of rhodamine-B, tetraphenylbutadiene, and, p-bis[2-(5 phenyloxazolyl)]-benzene.

6. The radiation detection system of claim 4, wherein said solvent is selected from the group consisting of toluene and polystyrene and said final solute is rhodamine-B.

7. The radiation detection system of claim 6, including p-terphenyl as a first intermediate solute and a second solute selected from the group consisting of 2,5-dibiphenylyloxazole, p-bis[2-(5 phenyloxazolyl)]-benzene, tetraphenylbutadiene, and dimethyl p-bis[2-(5 phenyloxazolyl)]-benzene.

8. The radiation detection system of claim 3, wherein said means for emitting light additionally comprises a quench selected from the group consisting of nitrobenzene and phenol.

9. The radiation detection system of claim 4, wherein said solvent is pseudocumene, said final solute is tetraphenylbutadiene and including 2-phenyl-5-(4-biphenylyl)-1,3,4 oxadiazole as an intermediate solute.

10. The radiation detection system of claim 4, wherein said solvent is toluene and said solutes are selected from the group consisting of p-terphenyl, 2,5-dibiphenylyloxazole, p-bis[2-(5 phenyloxazolyl)]-benzene, tetraphenylbutadiene, and rhodamine-B.

11. The radiation detection system of claim 10, wherein said means for emitting light includes a quench selected from the group consisting of nitrobenzene and phenol.

12. The radiation detection system of claim 4, wherein said solvent is p-xylene and said solute is p-terphenyl.

13. The radiation detection system of claim 12, wherein said means for emitting light includes a nitrobenzene quench.

14. The radiation detection system of claim 4, wherein said solvent is polystyrene and said solutes are selected from the group consisting of p-terphenyl, p-bis[2-(5 phenyloxazolyl)]-benzene, dimethyl p-bis[2-(5 phenyloxazolyl)]-benzene, and rhodamine-B.

15. The radiation detection system of claim 14, wherein said means for emitting light includes a phenol quench.

16. The radiation detection system of claim 1 including an optical filter positioned at either end of said fiber optic wave guide for passing wavelengths greater than about 500 nm.

17. The radiation detection system of claim 16 wherein said means for emitting light comprises a fluor solvent and a succession of fluor solutes including at least one intermediate and a final solute and the emission band of said solvent and each successive solute overlaps with the absoption band of the next successive solute.

18. The radiation detection system of claim 17, wherein said solvent is selected from the group consisting of toluene, pseudocumene, p-xylene, polystyrene, and polyvinyltoluene.

19. The radiation detection system of claim 17, wherein said final solute is selected from the group consisting of rhodamine-B, tetraphenylbutadiene, and p-bis[2-(5 phenyloxazolyl)]-benzene.

20. The radiation detection system of claim 18, wherein said solvent is selected from the group consisting of toluene and polystyrene and said final solute is rhodamine-B.

21. The radiation detection system of claim 20, including p-terphenyl as a first intermediate solute and a second solute selected from the group consisting of 2,5-dibiphenylyloxazole, p-bis[2-(5 phenyloxazolyl)]-benzene, tetraphenylbutadiene, and dimethyl p-bis[2-(5 phenyloxazolyl)]-benzene.

22. The radiation detection system of claim 17, wherein said means for emitting light additionally comprises a quench selected from the group consisting of nitrobenzene and phenol.

23. The radiation detection system of claim 18, wherein said solvent is pseudocumene, said final solute is tetraphenylbutadiene and including 2-phenyl-5-[4-biphenylyl]-1,3,4 oxadiazole as an intermediate solute.

24. The radiation detection system of claim 18, wherein said solvent is toluene and said solutes are selected from the group consisting of p-terphenyl, 2,5-dibiphenylyloxazole, p-bis[2-(5 phenyloxazolyl)]-benzene, tetraphenylbutadiene, and rhodamine-B.

25. The radiation detection system of claim 24, wherein said means for emitting light includes a quench selected from the group consisting of nitrobenzene and phenol.

26. The radiation detection system of claim 18, wherein said solvent is p-xylene and said solute is p-terphenyl.

27. The radiation detection system of claim 26, wherein said means for emitting light includes a nitrobenzene quench.

28. The radiation detection system of claim 18, wherein said solvent is polystyrene and said solutes are selected from the group consisting of p-terphenyl, p-bis[2-(5 phenlyoxazolyl)]-benzene, dimethyl p-bis[2-(5 phenlyoxazolyl)]-benzene, and rhodamine-B.

29. The radiation detection system of claim 28, wherein said means for emitting light includes a phenol quench.

* * * * *